US011963278B2

(12) United States Patent
Wen et al.

(10) Patent No.: US 11,963,278 B2
(45) Date of Patent: Apr. 16, 2024

(54) LIGHTING APPARATUS

(71) Applicant: LEEDARSON LIGHTING CO.,LTD., Fujian (CN)

(72) Inventors: Shuisheng Wen, Fujian (CN); Haiyan Chen, Fujian (CN); Zulong Liu, Fujian (CN); Bin Liu, Fujian (CN)

(73) Assignee: LEEDARSON LIGHTNG CO., LTD., Fujian (CN)

( * ) Notice: Subject to any disclaimer, the term of this patent is extended or adjusted under 35 U.S.C. 154(b) by 0 days.

(21) Appl. No.: 17/994,366

(22) Filed: Nov. 27, 2022

(65) Prior Publication Data

US 2023/0397313 A1 Dec. 7, 2023

(30) Foreign Application Priority Data

Jun. 2, 2022 (CN) ......................... 202221384190.8

(51) Int. Cl.

| | |
|---|---|
| ***H05B 45/325*** | (2020.01) |
| ***H05B 45/10*** | (2020.01) |
| ***H05B 45/20*** | (2020.01) |
| ***H05B 45/345*** | (2020.01) |
| ***H05B 45/56*** | (2020.01) |

(52) U.S. Cl.

CPC ............. *H05B 45/56* (2020.01); *H05B 45/10* (2020.01); *H05B 45/20* (2020.01); *H05B 45/325* (2020.01); *H05B 45/345* (2020.01)

(58) Field of Classification Search

CPC ........ H05B 47/10; H05B 45/10; H05B 45/30; H05B 45/32; H05B 45/325; H05B 45/345

See application file for complete search history.

(56) References Cited

U.S. PATENT DOCUMENTS 10,757,769 B2 * 8/2020 Liu ......................... H02H 3/22

FOREIGN PATENT DOCUMENTS

CN 204349448 U * 5/2015

* cited by examiner

*Primary Examiner* — Jimmy T Vu

(74) *Attorney, Agent, or Firm* — Chun-Ming Shih; HDLS IPR SERVICES

(57) ABSTRACT

A lighting apparatus includes a surge voltage protector, a first rectifier, a first DC-DC converter, a first DC filter, a first constant current source, a second rectifier, a second DC-DC converter, a second DC filter, a second constant current source, a first PWM generator, a second PWM generator, a dimmer controller, a first light source and a second light source. The surge voltage protector is coupled to an external power for relaying an AC power. When there is a surge voltage is detected, the surge voltage protector disable routing the AC power. There are two or more paths of power circuits each generating a limited power. These power circuits are placed in the same container to simplify the overall design.

20 Claims, 9 Drawing Sheets

LIGHTING APPARATUS

FIELD

The present invention is related to a lighting apparatus, and more particularly related to a lighting apparatus with large power output.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Safety is always a critical issue for designing light devices. However, it is often a heavy cost to meet a safety standard, e.g. fire proof safety standard.

To protect users, for example, when a consumed power is larger than a threshold, more protection mechanisms are needed. Sometimes, that means a metal box is needed to isolate a driver circuit, but the metal box is expensive.

It is therefore beneficial to design a low cost solution that meeting safety standard requirements while being capable of providing a flexible current output. Safety is always a critical issue for designing light devices. However, it is often a heavy cost to meet a safety standard, e.g. fire proof safety standard.

To protect users, for example, when a consumed power is larger than a threshold, more protection mechanisms are needed. Sometimes, that means a metal box is needed to isolate a driver circuit, but the metal box is expensive.

It is therefore beneficial to design a low cost solution that meeting safety standard requirements while being capable of providing a flexible current output. Safety is always a critical issue for designing light devices. However, it is often a heavy cost to meet a safety standard, e.g. fire proof safety standard.

To protect users, for example, when a consumed power is larger than a threshold, more protection mechanisms are needed. Sometimes, that means a metal box is needed to isolate a driver circuit, but the metal box is expensive.

It is therefore beneficial to design a low cost solution that meeting safety standard requirements while being capable of providing a flexible current output. Safety is always a critical issue for designing light devices. However, it is often a heavy cost to meet a safety standard, e.g. fire proof safety standard.

To protect users, for example, when a consumed power is larger than a threshold, more protection mechanisms are needed. Sometimes, that means a metal box is needed to isolate a driver circuit, but the metal box is expensive.

It is therefore beneficial to design a low cost solution that meeting safety standard requirements while being capable of providing a flexible current output.

SUMMARY

In some embodiments, a lighting apparatus includes a surge voltage protector, a first rectifier, a first DC-DC converter, a first DC filter, a first constant current source, a second rectifier, a second DC-DC converter, a second DC filter, a second constant current source, a first PWM generator, a second PWM generator, a dimmer controller, a first light source and a second light source.

The surge voltage protector is coupled to an external power for relaying an AC power.

When there is a surge voltage is detected, the surge voltage protector disable routing the AC power.

The first rectifier is coupled to the surge voltage protector.

The first rectifier includes a first bridge circuit to covert the AC power to a first DC power.

The first DC-DC converter converts the first DC power to a second DC power.

The second DC power has a lower voltage than the first DC power.

The first DC filter filters the second DC power to a third DC power.

The third DC power has a lower frequency than the second DC power.

The first constant current source is coupled to the first DC filter for receiving the third DC power as a first energy source.

The second rectifier is coupled to the same surge voltage protector.

The second rectifier includes a second bridge circuit to convert the AC power to a fourth DC power.

The second DC-DC converter converts the fourth DC power to a fifth DC power.

The fifth DC power has a lower voltage than the fourth DC power.

The second DC filter filters the fifth DC power to a sixth DC power.

The sixth DC power has a lower frequency than the fifth DC power.

The second constant current source is coupled to the second DC filter for receiving the sixth DC power as a second energy source.

The first PWM generator generates a first PWM signal based on a dimmer control signal.

The second PWM generator generates a second PWM signal based on the dimmer control signal.

The dimmer controller is coupled to the first PWM generator and the second PWM generator for converting an operation to the dimmer control signal.

The first light source is coupled to the first constant current source to receive a first driving current from the first constant current source.

The first driving current is associated to the first PWM signal.

The second light source is coupled to the second constant current source to receive a second driving current from the second constant current source.

The second driving current is associated to the second PWM signal.

In some embodiments, the first rectifier, the first DC-DC converter, the first filter, the first constant current source, the second rectifier, the second DC-DC converter, the second filter, the second constant current source are placed in a same driver container.

In some embodiments, the first driving current consumes less than 100 W energy.

The second driving current consumes less than 100 W energy, but the first driving current and the second driving current together consumes more than 100 W energy.

In some embodiments, the driver container is composed of a fire proof material meeting H-B standard of UL 94 class-action.

In some embodiments, the driver container is not enclosed with a metal shield.

In some embodiments, the first rectifier, the first DC-DC converter, the first filter, the first constant current source is an isolated Low Voltage Limited Energy In some embodiments, the first rectifier, the first DC-DC converter, the first filter, the first constant current source, the second rectifier, the second DC-DC converter, the second filter, the second constant current source are enclosed with a same heap of thermal grease.

In some embodiments, the lighting apparatus may also include a third rectifier, a third DC-DC converter, a third filter and a third constant current source to share the same surge voltage protector and placed in the same driver container.

In some embodiments, the lighting apparatus may also include a temperature sensor placed in the driver container to disable the first constant current source and the second constant current source when the temperature sensor detects an abnormal temperature in the driver container.

In some embodiments, the first light source includes multiple types of first LED chips with different optical parameters.

The first driving current includes multiple second sub-driving currents supplied to the multiple types of first LED chips according to the first PWM signal to render a first mixed light with a first mixed light parameter.

In some embodiments, the first PWM signal includes multiple first sub-PWM signals respectively corresponding to the multiple types of first LED chips.

In some embodiments, the second light source includes multiple types of second LED Chips.

The second driving current includes multiple second sub-driving currents supplied to the multiple types of second LED chips according to the second PWM signal to render a second mixed light with a second mixed light parameter.

In some embodiments, the first PWM signal and the second PWM signal are the same.

In some embodiments, the first mixed light parameter is different form the second mixed light parameter because the multiple types of first LED chips has a different arrangement from the multiple types of second LED chips.

In some embodiments, the multiple types of first LED chips has a different arrangement from the multiple types of second LED chips.

In some embodiments, the first mixed light parameter includes a desired mixed color temperate.

In some embodiments, the first mixed light parameter includes a desired mixed color.

In some embodiments, the first mixed light parameter includes a desired mixed light intensity.

In some embodiments, the lighting apparatus may also include a first abnormal case controller for turning off the first constant current source when detecting an abnormal voltage range.

In some embodiments, the lighting apparatus may also include a second abnormal case controller for turning off the second constant current source when detecting the abnormal voltage range.

DETAILED DESCRIPTION

Figure 6:
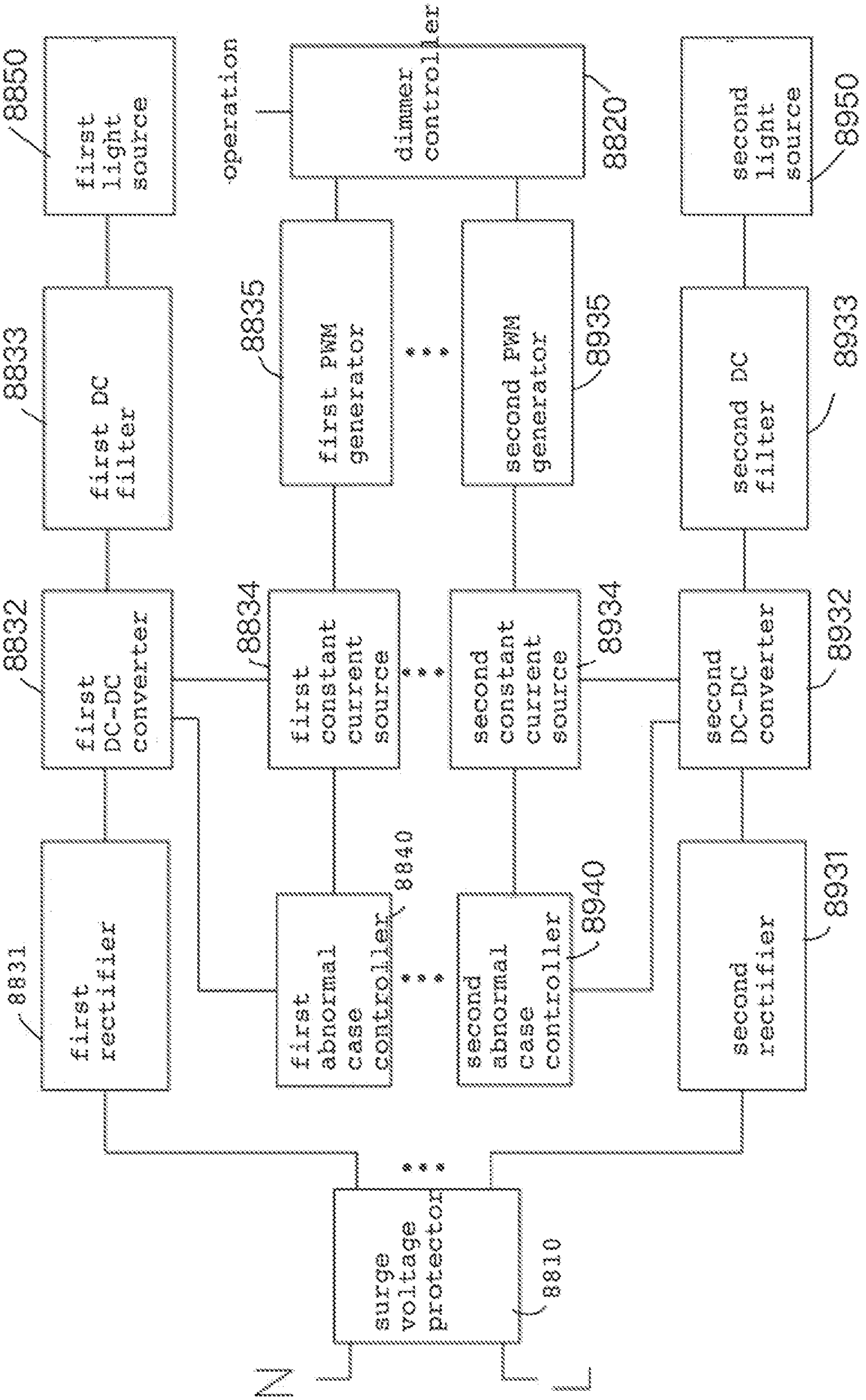
FIG. 6 illustrates a structure of a second lighting apparatus embodiment.

In FIG. 6, a lighting apparatus includes a surge voltage protector 8810, a first rectifier 8831, a first DC-DC converter 8832, a first DC filter 8833, a first constant current source 8850, a second rectifier 8931, a second DC-DC converter 8932, a second DC filter 8933, a second constant current source 8934, a first PWM generator 8835, a second PWM generator 8935, a dimmer controller 8820, a first light source 8850 and a second light source 8950.

The surge voltage protector 8810 is coupled to an external power for relaying an AC power. For example, the AC power is an inhouse 110V AC power source.

When there is a surge voltage is detected, the surge voltage protector 8810 disables routing the AC power.

The first rectifier 8831 is coupled to the surge voltage protector 8810.

Figure 7:
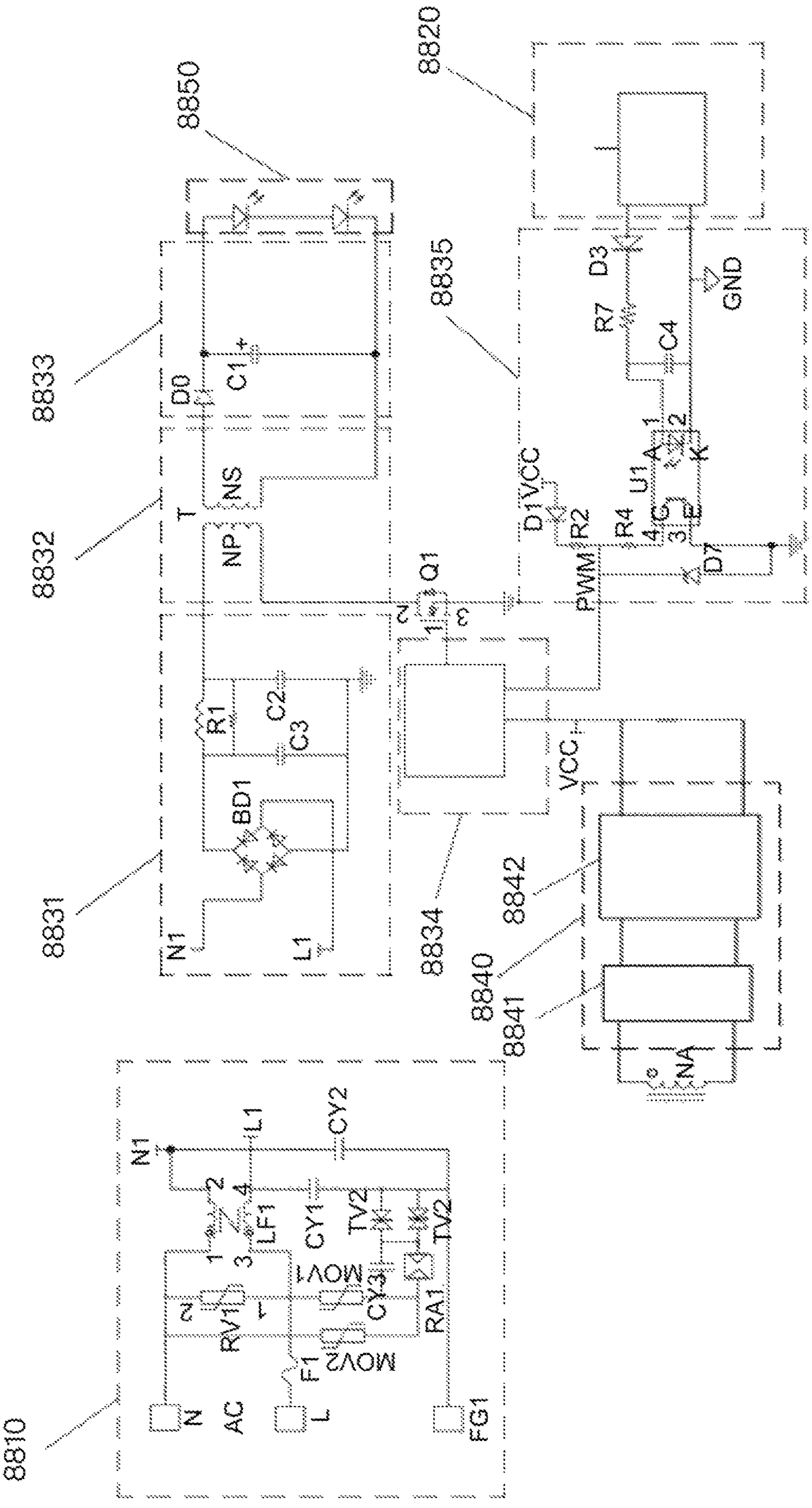
FIG. 7 illustrates a detailed circuit example for the example of FIG. 6.

The first rectifier 8831 includes a first bridge circuit to covert the AC power to a first DC power. For example, the bridge circuit BD1 in FIG. 7 shows such concept.

The first DC-DC converter 8832 converts the first DC power to a second DC power.

The second DC power has a lower voltage than the first DC power. For example, the first DC power has a larger voltage level than the second DC power.

The AC power, the first DC power, the second DC power and other similar electrical signals are invisible physical signals but may be clearly identified accompanying the drawings and thus are not explicitly marked on the drawings.

For example, persons of ordinary skilled in the art may clearly know the first DC power is an electrical signal between the first rectifier 8831 and the first DC-DC converter 8832.

In addition, if two reference numerals among different drawings are the same, they may refer to the same component or components in different abstract level. If one reference numeral is explained, it may not be repeated for the same reference numeral in another drawing.

The first DC filter 8833 filters the second DC power to a third DC power.

The third DC power has a lower frequency than the second DC power. For example, the second DC power is a low frequency DC power.

The first constant current source 8834 is coupled to the first DC filter 8833 for receiving the third DC power as a first energy source. Please be noted that the DC filter 8833 is coupled to the first constant current source 8834 indirectly.

The second rectifier 8931 is coupled to the same surge voltage protector 8810.

The second rectifier 8931 includes a second bridge circuit to convert the AC power to a fourth DC power.

The second DC-DC converter 8932 converts the fourth DC power to a fifth DC power.

The fifth DC power has a lower voltage than the fourth DC power.

The second DC filter 8933 filters the fifth DC power to a sixth DC power.

The sixth DC power has a lower frequency than the fifth DC power.

The second constant current source 8934 is coupled to the second DC filter 8933 for receiving the sixth DC power as a second energy source.

The first PWM generator 8835 generates a first PWM signal based on a dimmer control signal.

The second PWM generator 8935 generates a second PWM signal based on the dimmer control signal.

The dimmer controller 8820 is coupled to the first PWM generator 8835 and the second PWM generator 8935 for converting an operation to the dimmer control signal.

As mentioned above, the dimmer control signal is an electrical signal transmitted from the dimmer controller 8820 to the first PWM generator 8835 and the second PWM generator 8935.

The first light source 8850 is coupled to the first constant current source 8834 indirectly to receive a first driving current from the first constant current source 8834.

The first driving current is associated to the first PWM signal.

The second light source 8950 is coupled to the second constant current source 8934 to receive a second driving current from the second constant current source 8934.

The second driving current is associated to the second PWM signal.

FIG. 7 shows a detailed circuit example showing an option to implement the components in FIG. 6. Please be noted that there are multiple ways to implement the components in FIG. 7. Reference numerals in FIG. 6 refer to the same components in FIG. 7 with a different abstract level, and thus the reference numerals are not recited again for brevity.

In some embodiments, the first rectifier, the first DC-DC converter, the first filter, the first constant current source, the second rectifier, the second DC-DC converter, the second filter, the second constant current source are placed in a same driver container.

Figure 8:
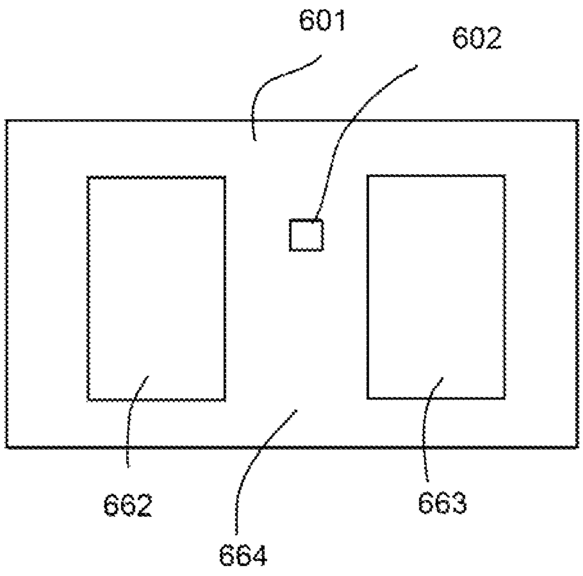
FIG. 8 shows another lighting apparatus embodiment.

For example, FIG. 8 shows a container box 601. The first rectifier, the first DC-DC converter, the first filter and the first constant current source are integrated as a first power path 662. The second rectifier, the second DC-DC converter, the second filter and the second constant current source are integrated as a second power path 663. The first power path 662 and the second power path 663 are placed in the same driver container, e.g. a box. In some embodiments, the first driving current consumes less than 100 W energy.

The second driving current consumes less than 100 W energy, but the first driving current and the second driving current together consumes more than 100 W energy.

In some embodiments, the driver container is composed of a fire proof material meeting H-B standard of UL 94 class-action. The UL 94 class-action is a fire proof standard defining certain safety design requirements. If a driver generates a large current, the driver needs to be enclosed in a metal box.

In some embodiments, the driver container is not enclosed with a metal shield.

In some embodiments, the first rectifier, the first DC-DC converter, the first filter, the first constant current source is an isolated Low Voltage Limited Energy.

In some embodiments, the first rectifier, the first DC-DC converter, the first filter, the first constant current source, the second rectifier, the second DC-DC converter, the second filter, the second constant current source are enclosed with a same heap of thermal grease.

For example, thermal grease 664 may be filled in the driver container 601 so that the first power path 662 and the second power path 663 may share the same thermal grease 664.

In some embodiments, the lighting apparatus may also include a third rectifier, a third DC-DC converter, a third filter and a third constant current source to share the same surge voltage protector and placed in the same driver container.

Please refer to FIG. 6. There are three dots between the first constant current source 8834 and the second current source 8934. The third constant current source may be placed just like the first constant current source 8834 and the second constant current source 8934 as illustrated in FIG. 6.

More than three power paths may be used too, depending on physical limitation of the driver container and the requirement of overall power output.

The same logic applies to other components and are not repeated here for brevity.

In FIG. 8, the lighting apparatus may also include a temperature sensor 602 placed in the driver container 601 to disable the first constant current source and the second constant current source when the temperature sensor 602 detects an abnormal temperature in the driver container.

In some embodiments, the first light source includes multiple types of first LED chips with different optical parameters.

Figure 9:
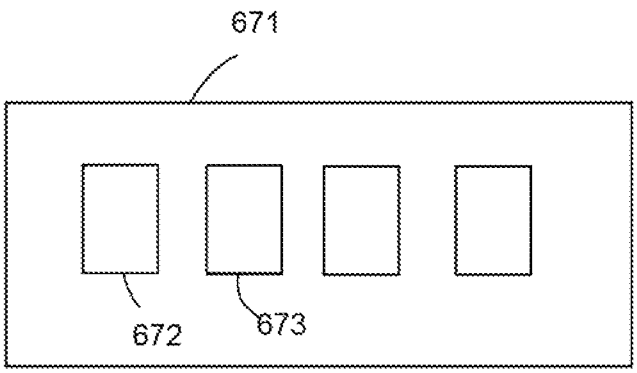
FIG. 9 shows a light source structure example.

FIG. 9 illustrates an example of such concept. In FIG. 9, the first light source 671 has two first LED chips 672 and 673, but the two LED chips 672 and 673 emit lights of different light parameters.

The first driving current includes multiple second sub-driving currents supplied to the multiple types of first LED chips according to the first PWM signal to render a first mixed light with a first mixed light parameter.

As mentioned above, the first constant current source 8834 and the second constant current source 8934 generate driving currents. In such case, the constant current sources each generates more than one driving currents as sub-driving current respectively supplied to different type of LED chips.

In some embodiments, the first PWM signal includes multiple first sub-PWM signals respectively corresponding to the multiple types of first LED chips.

PWM signal refers to Pulse Width Modulation. In such control design, a duty ratio, e.g. an active time period, determines a total volume of energy in a time period supplied to the light source.

In some embodiments, the second light source includes multiple types of second LED chips.

The second driving current includes multiple second sub-driving currents supplied to the multiple types of second LED chips according to the second PWM signal to render a second mixed light with a second mixed light parameter.

In some embodiments, the first PWM signal and the second PWM signal are the same.

In some embodiments, the first mixed light parameter is different form the second mixed light parameter because the multiple types of first LED chips has a different arrangement from the multiple types of second LED chips.

In some embodiments, the multiple types of first LED chips has a different arrangement from the multiple types of second LED chips.

In some embodiments, the first mixed light parameter includes a desired mixed color temperate.

In some embodiments, the first mixed light parameter includes a desired mixed color.

In some embodiments, the first mixed light parameter includes a desired mixed light intensity.

In FIG. 6, the lighting apparatus may also include a first abnormal case controller 8840 for turning off the first constant current source when detecting an abnormal voltage range.

In FIG. 6, the lighting apparatus may also include a second abnormal case controller 8940 for turning off the second constant current source when detecting the abnormal voltage range.

For example, the detailed circuit diagram in FIG. 7 shows an example to implement such abnormal case controller.

Figure 1:
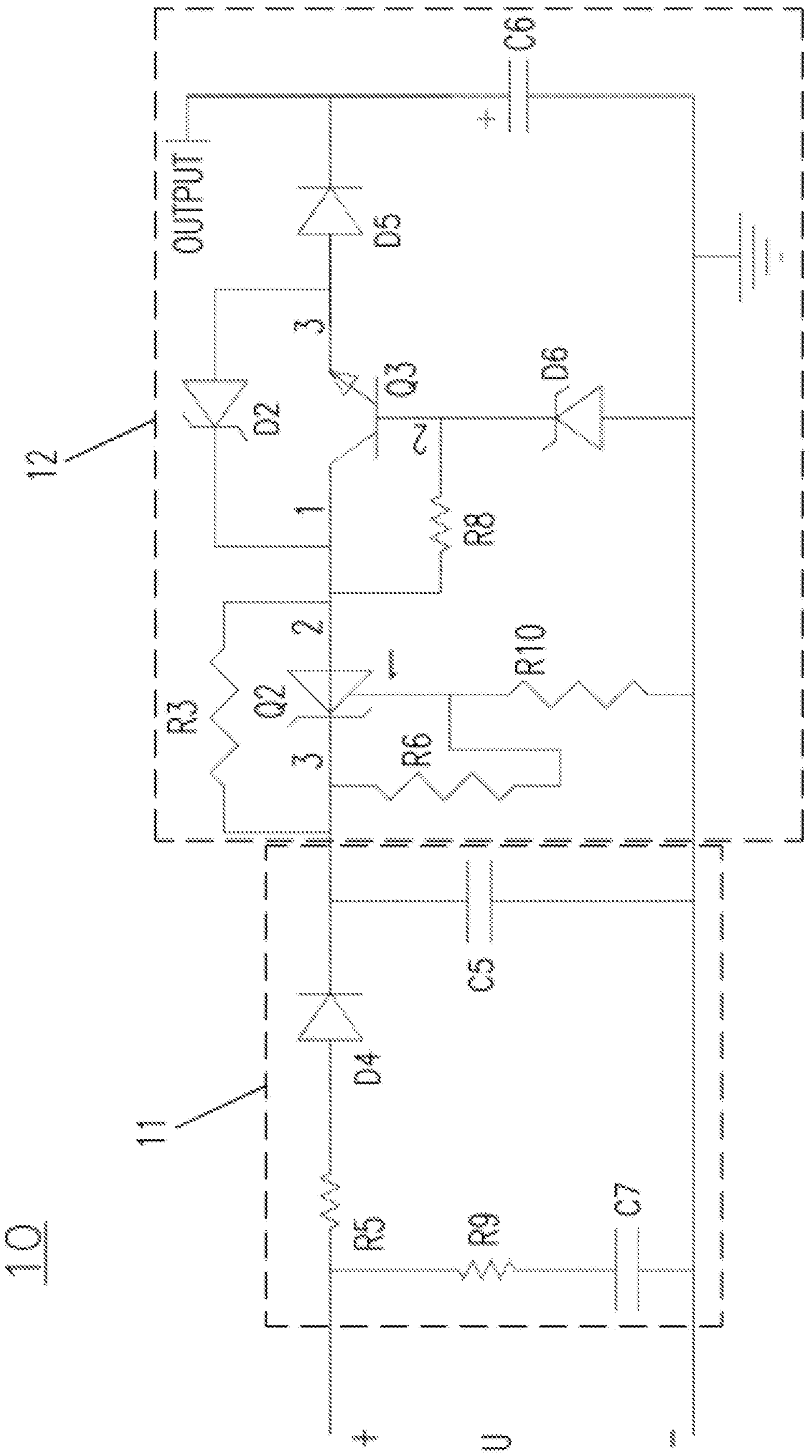
FIG. 1 illustrates a driver circuit example.

Please refer to FIG. 1, which shows an abnormal case controller example 10.

The circuit includes a filter module 11 composed of a diode D4, a resistor R5, a resistor R9, a capacitor C7, and a capacitor C5.

The circuit also includes a control module 12 composed of Zenith diodes D2, D5, D6, a comparator Q2, resistors R3, R8, R6, R10 and a transistor Q3, and a capacitor C6 to cut voltage when abnormal voltage is detected by the comparator Q2.

Figure 2:
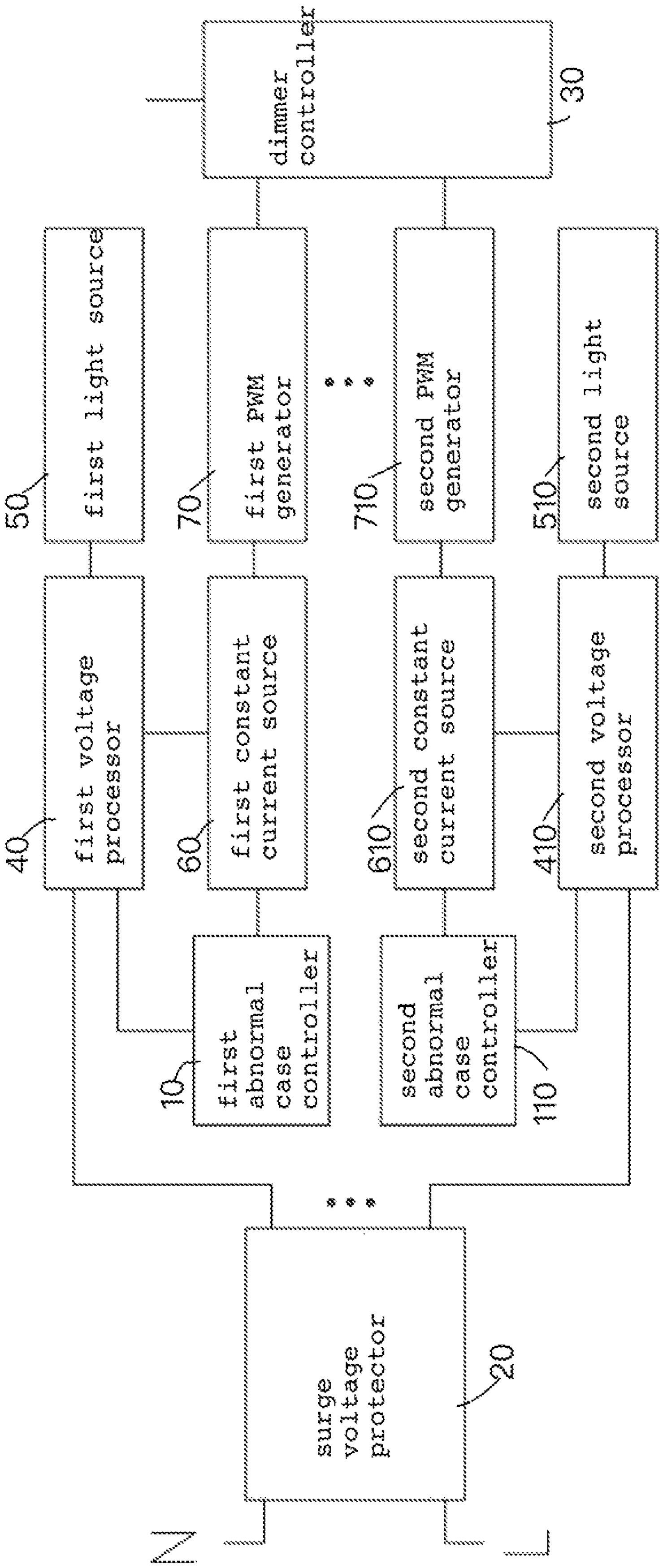
FIG. 2 illustrates a first circuit embodiment for driving a light source.

FIG. 2 shows an embodiment similar to the embodiment in FIG. 6.

In FIG. 2, the lighting apparatus includes a surge voltage protector 20, a first abnormal case controller 10, a first voltage processor 40, a first light source, a first constant current source 60, a first PWM generator 70, a dimmer controller 30, a second abnormal case controller 110, a second constant current source 610, a second PWM generator 710, a second voltage processor 410, and a second light source 510.

The first voltage processor 40 and the second voltage processor 410 may include various configurations of circuits to convert an external power to a proper driving currents supplying to the first light source 50 and the second light source 510.

Other components in FIG. 2 function similarly to the example in FIG. 6 and thus are not repeated again for brevity.

Figure 3:
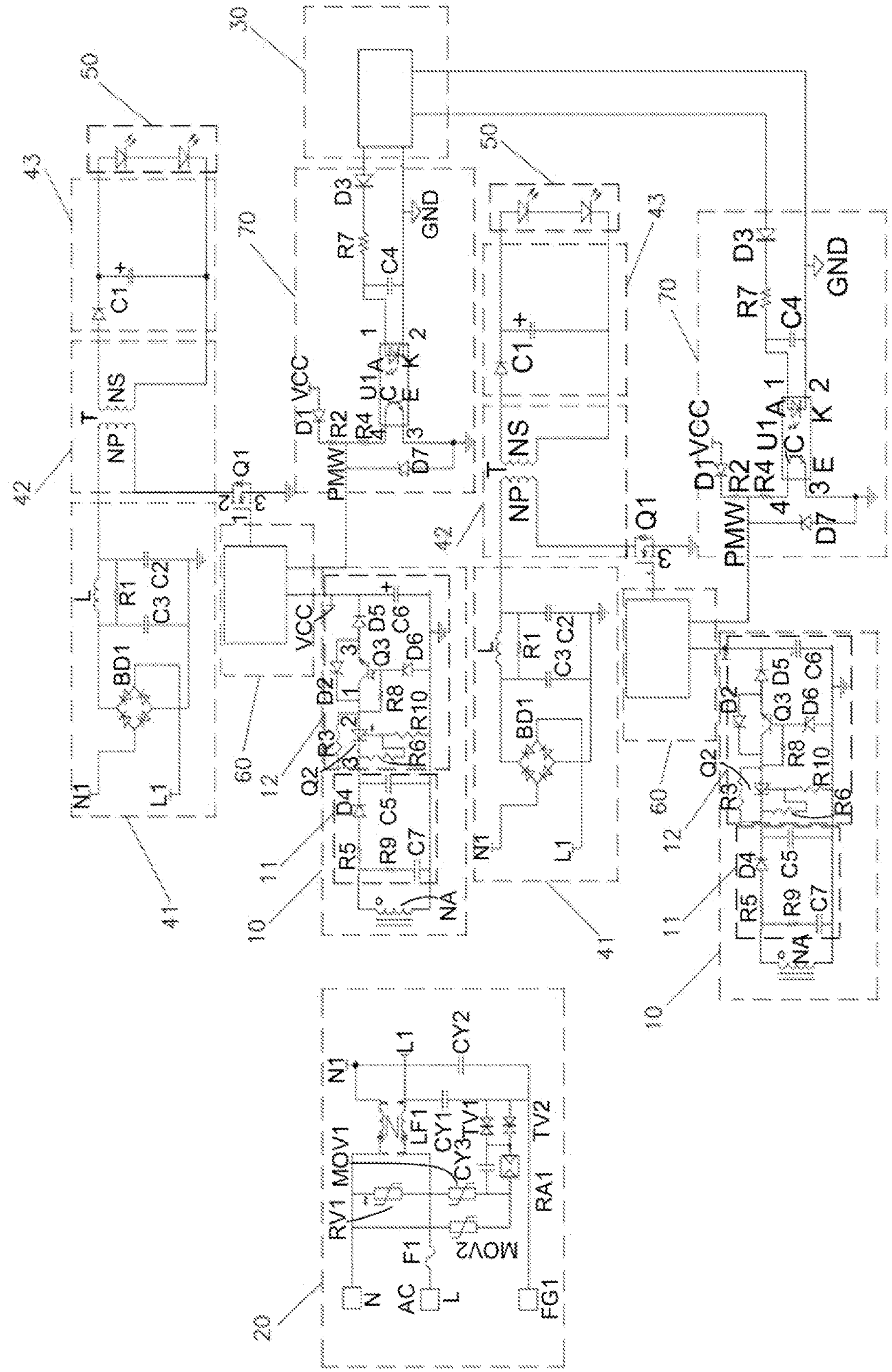
FIG. 3 illustrates a detailed circuit example corresponding to the example of FIG. 2.

Please refer to FIG. 3, FIG. 3 show an example of detailed circuits for implementing each components illustrated in FIG. 2.

In addition, FIG. 3 shows that the first voltage processor 40 includes a rectifier 41, a DC-DC converter 42 and a filter 43.

The abnormal case controller 10 has a filter module 11 and a controller module 12.

Figure 4:
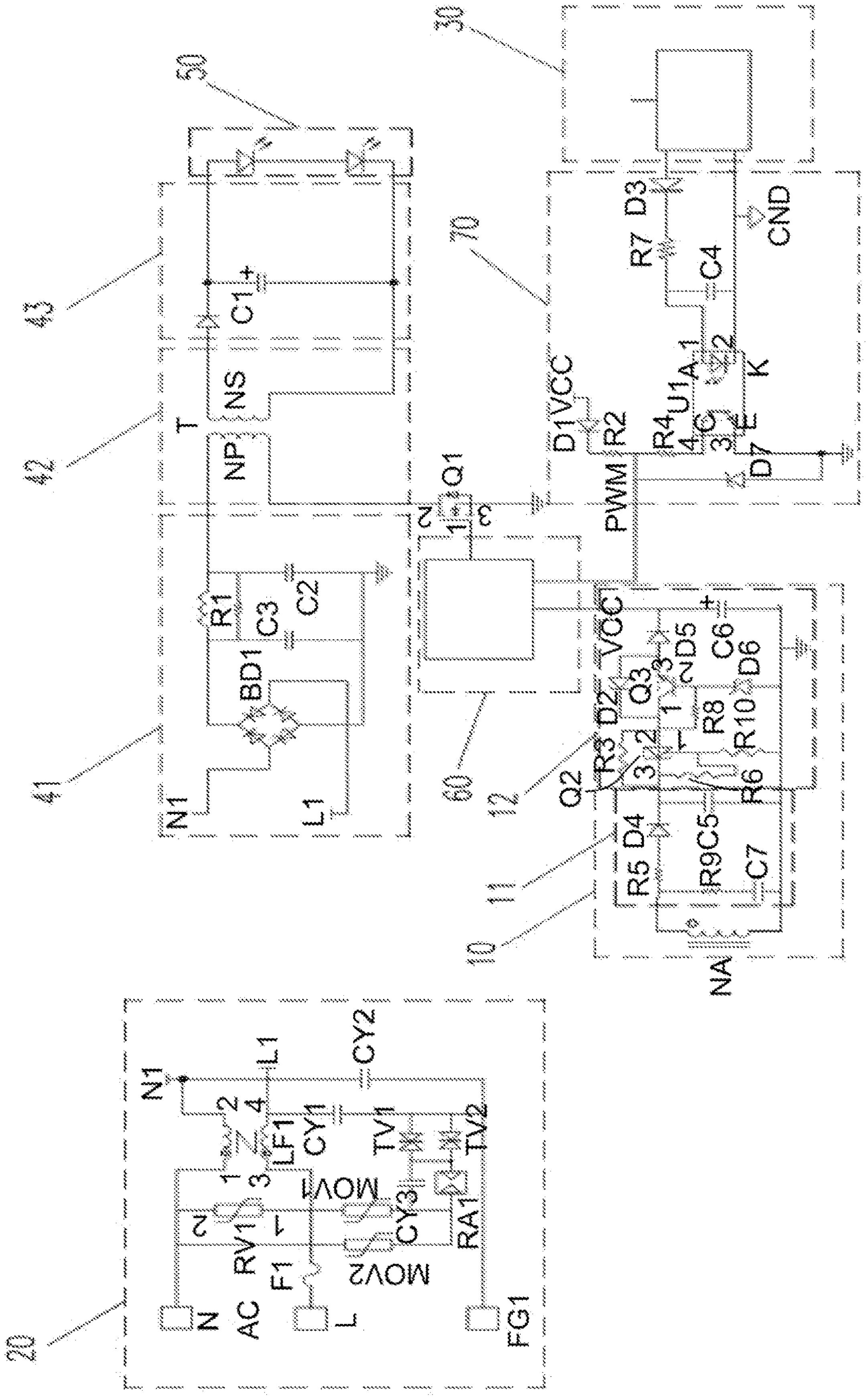
FIG. 4 illustrates a circuit structure in a lighting apparatus embodiment.

FIG. 4 shows a more detailed example for implementing such components.

Figure 5:
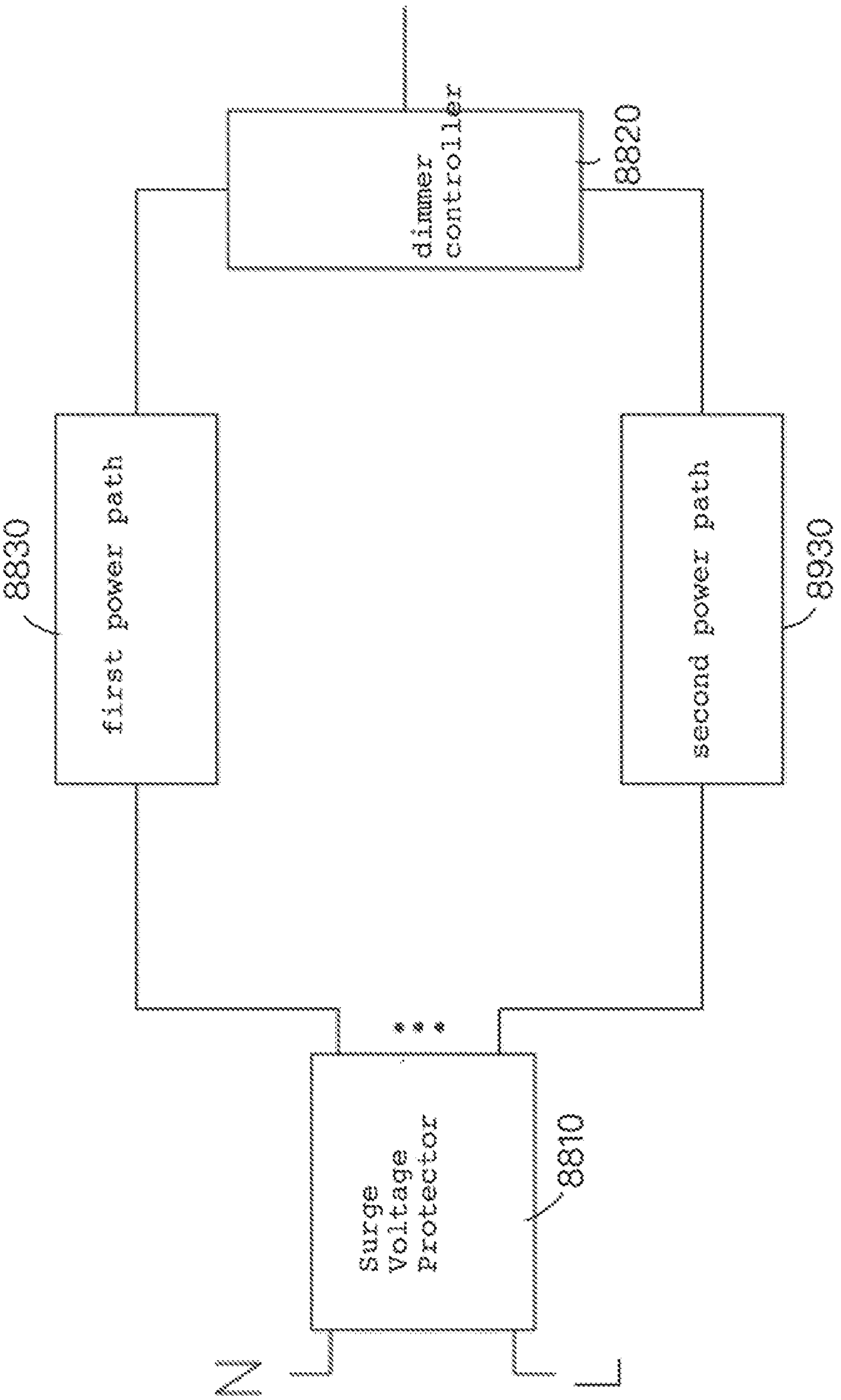
FIG. 5 illustrates a second embodiment of a lighting apparatus.

FIG. 5 is a diagram showing an abstract concept. In FIG. 5, two power paths 8830, 8930 share the surge voltage protector 8810 and the dimmer controller 8820.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a surge voltage protector for coupled to an external power for relaying an AC power, wherein when there is a surge voltage is detected, the surge voltage protector disable routing the AC power;

a first rectifier coupled to the surge voltage protector, wherein the first rectifier comprises a first bridge circuit to covert the AC power to a first DC power;

a first DC-DC converter for converting the first DC power to a second DC power, the second DC power has a lower voltage than the first DC power;

a first DC filter for filtering the second DC power to a third DC power, wherein the third DC power has a lower frequency than the second DC power;

a first constant current source coupled to the first DC filter for receiving the third DC power as a first energy source;

a second rectifier coupled to the same surge voltage protector, wherein the second rectifier comprises a second bridge circuit to convert the AC power to a fourth DC power;

a second DC-DC converter for converting the fourth DC power to a fifth DC power, the fifth DC power has a lower voltage than the fourth DC power;

a second DC filter for filtering the fifth DC power to a sixth DC power, wherein the sixth DC power has a lower frequency than the fifth DC power;

a second constant current source coupled to the second DC filter for receiving the sixth DC power as a second energy source;

a first PWM generator for generating a first PWM signal based on a dimmer control signal;

a second PWM generator for generating a second PWM signal based on the dimmer control signal;

a dimmer controller coupled to the first PWM generator and the second PWM generator for converting an operation to the dimmer control signal, a first light source coupled to the first constant current source to receive a first driving current from the first constant current source, wherein the first driving current is associated to the first PWM signal; and a second light source coupled to the second constant current source to receive a second driving current from the second constant current source, wherein the second driving current is associated to the second PWM signal.

2. The lighting apparatus of claim 1, wherein the first rectifier, the first DC-DC converter, the first filter, the first constant current source, the second rectifier, the second DC-DC converter, the second filter, the second constant current source are placed in a same driver container.

3. The lighting apparatus of claim 2, wherein the first driving current consumes less than 100 W energy, wherein the second driving current consumes less than 100 W energy, but the first driving current and the second driving current together consumes more than 100 W energy.

4. The lighting apparatus of claim 3, wherein the driver container is composed of a fire proof material meeting H-B standard of UL 94 class-action.

5. The lighting apparatus of claim 4, wherein the driver container is not enclosed with a metal shield.

6. The lighting apparatus of claim 2, wherein the first rectifier, the first DC-DC converter, the first filter, the first constant current source is an isolated Low Voltage Limited Energy.

7. The lighting apparatus of claim 2, wherein the first rectifier, the first DC-DC converter, the first filter, the first constant current source, the second rectifier, the second DC-DC converter, the second filter, the second constant current source are enclosed with a same heap of thermal grease.

8. The lighting apparatus of claim 2, further comprising a third rectifier, a third DC-DC converter, a third filter and a third constant current source to share the same surge voltage protector and placed in the same driver container.

9. The lighting apparatus of claim 2, further comprising a temperature sensor placed in the driver container to disable the first constant current source and the second constant current source when the temperature sensor detects an abnormal temperature in the driver container.

10. The lighting apparatus of claim 1, wherein the first light source comprises multiple types of first LED chips with different optical parameters, wherein the first driving current comprises multiple second sub-driving currents supplied to the multiple types of first LED chips according to the first PWM signal to render a first mixed light with a first mixed light parameter.

11. The lighting apparatus of claim 10, wherein the first PWM signal comprises multiple first sub-PWM signals respectively corresponding to the multiple types of first LED chips.

12. The lighting apparatus of claim 10, wherein the second light source comprises multiple types of second LED Chips, wherein the second driving current comprises multiple second sub-driving currents supplied to the multiple types of second LED chips according to the second PWM signal to render a second mixed light with a second mixed light parameter.

13. The lighting apparatus of claim 12, wherein the first PWM signal and the second PWM signal are the same.

14. The lighting apparatus of claim 13, wherein the first mixed light parameter is different form the second mixed light parameter because the multiple types of first LED chips has a different arrangement from the multiple types of second LED chips.

15. The lighting apparatus of claim 12, wherein the multiple types of first LED chips has a different arrangement from the multiple types of second LED chips.

16. The lighting apparatus of claim 10, wherein the first mixed light parameter comprises a desired mixed color temperate.

17. The lighting apparatus of claim 10, wherein the first mixed light parameter comprises a desired mixed color.

18. The lighting apparatus of claim 10, wherein the first mixed light parameter comprises a desired mixed light intensity.

19. The lighting apparatus of claim 1, further comprising a first abnormal case controller for turning off the first constant current source when detecting an abnormal voltage range.

20. The lighting apparatus of claim 19, further comprising a second abnormal case controller for turning off the second constant current source when detecting the abnormal voltage range.

* * * * *